(12) United States Patent
Honda

(10) Patent No.: US 9,749,554 B2
(45) Date of Patent: Aug. 29, 2017

(54) SYSTEMS AND METHODS FOR WEIGHTED IMAGE SIGNAL READOUT

(71) Applicant: SEMICONDUCTOR COMPONENTS INDUSTRIES, LLC, Phoenix, AZ (US)

(72) Inventor: Hidenari Honda, Itabashi-ku (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 6 days.

(21) Appl. No.: 14/831,437

(22) Filed: Aug. 20, 2015

(65) Prior Publication Data

US 2017/0054925 A1 Feb. 23, 2017

(51) Int. Cl.
*H04N 5/345* (2011.01)
*H04N 5/232* (2006.01)
*H04N 5/347* (2011.01)
*H04N 9/04* (2006.01)

(52) U.S. Cl.
CPC ....... *H04N 5/3456* (2013.01); *H04N 5/23241* (2013.01); *H04N 5/23245* (2013.01); *H04N 5/347* (2013.01); *H04N 9/045* (2013.01)

(58) Field of Classification Search
CPC ...... H04N 5/3456; H04N 5/347; H04N 5/378; H04N 5/2628
See application file for complete search history.

(56) References Cited

U.S. PATENT DOCUMENTS

| | | | |
|---|---|---|---|
| 5,886,703 A * | 3/1999 | Mauldin | G06T 15/04 345/423 |
| 6,873,732 B2 | 3/2005 | Dance | |
| 7,224,392 B2 * | 5/2007 | Cahill | H04N 5/2253 348/315 |
| 7,728,900 B2 * | 6/2010 | Fukushima | H04N 5/23212 348/294 |
| 7,982,788 B1 | 7/2011 | Linzer et al. | |
| 8,411,998 B2 | 4/2013 | Huggett et al. | |
| 8,780,238 B2 | 7/2014 | Bowers | |
| 9,131,173 B2 * | 9/2015 | Kim | H04N 5/2354 |
| 2003/0030737 A1 * | 2/2003 | Yanai | H04N 3/1562 348/296 |
| 2007/0181687 A1 * | 8/2007 | Fukushima | H04N 5/23212 235/454 |
| 2010/0066849 A1 | 3/2010 | Lim et al. | |
| 2012/0257091 A1 * | 10/2012 | Kim | H04N 5/2354 348/297 |

* cited by examiner

*Primary Examiner* — Nicholas Giles
(74) *Attorney, Agent, or Firm* — Treyz Law Group, P.C.; Zachary D. Hadd

(57) ABSTRACT

An imaging system may have a pixel array that includes a first group of pixels and a second group of pixels that generate image signals in response to light received from a scene. Image signals generated by the first group of pixels may be read out using a first skipping pattern and/or binning factor and image signals generated by the second group of pixels may be read out using a second skipping pattern and/or binning factor. The first and second skipping patterns and/or binning may be different and may be weighted based on the amount of image data that is available for different portions of the scene. An image may be generated based on the image signals that are read out from the first and second groups. Perspective correction operations may be used to correct for perspective distortion in the image.

7 Claims, 10 Drawing Sheets

SYSTEMS AND METHODS FOR WEIGHTED IMAGE SIGNAL READOUT

BACKGROUND

This relates generally to imaging devices, and more particularly, to imaging devices having selective image signal readout and processing capabilities.

Image sensors are commonly used in electronic devices such as cellular telephones, cameras, and computers to capture images. In a typical arrangement, an electronic device is provided with an array of image pixels arranged in pixel rows and pixel columns. The image pixels contain a photodiode for generating charge in response to image light. Circuitry is commonly coupled to each pixel column for reading out image signals from the image pixels.

In certain applications, it may be desirable to read out and/or process image signals from only some of the image pixels in an image pixel array (i.e., image signals from some of the image pixels in the pixel array are "skipped") in order to reduce power consumption of the imaging system. In conventional imaging systems, the ratio of image pixels from which image signals are read out and processed to image pixels that are "skipped" is constant across the entire image pixel array (i.e., image signals from only one out of every two image pixels in the array is read out and processed, image signals form only one out of every ten image pixels is read out and processed, or image signals form only one out of every fifteen image pixels in the array is read out and processed, etc.).

In applications such as wide-angle image capture with a digital camera "surround-view" image capture in automotive applications, however, image data may be more abundant in some parts of an image, while other parts of the image include less image data. In these applications, it may be desirable to use a different skipping ratio for pixels that generate image data in parts of the image that include more abundant data, while using a different skipping ratio for pixels that generate image data in parts of the image that include less abundant image data. Because conventional image sensors only use one skipping ratio for the entire image frame, however, the number of image pixels from which image signals are read out and processed will remain high in portions of the image with abundant image data in order to increase the resolution of the portions of the image with less abundant image data. This, however, increases power consumption of the imaging system. Alternatively, the number of image pixels from which image signals are read out and processed will be reduced in order to decrease the overall power consumption of the imaging system. This, however, decreases the resolution of portions of the image with less abundant image data.

It would therefore be desirable to be able to provide imaging systems with improved pixel readout capabilities.

DETAILED DESCRIPTION

Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
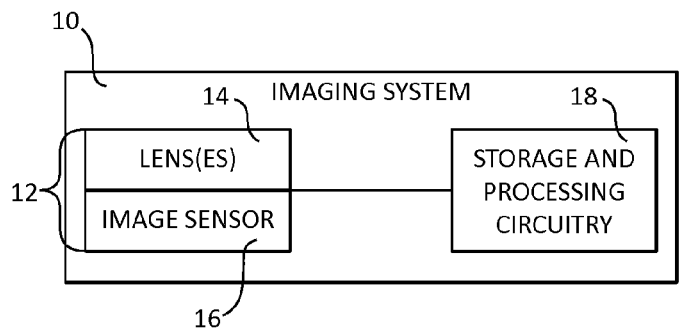
FIG. 1 is a diagram of an illustrative electronic device having an image sensor and processing circuitry for capturing images using a pixel array having image signal skipping and/or binning capabilities in accordance with an embodiment of the present invention.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 may be used to convert incoming light into digital image data. Camera 12 may include one or more lenses 14 and one or more corresponding image sensors 16. Lenses 14 may include fixed and/or adjustable lenses and may include microlenses formed on an imaging surface of image sensor 16. During image capture operations, light from a scene may be focused onto image sensor 16 by lenses 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Figure 2:
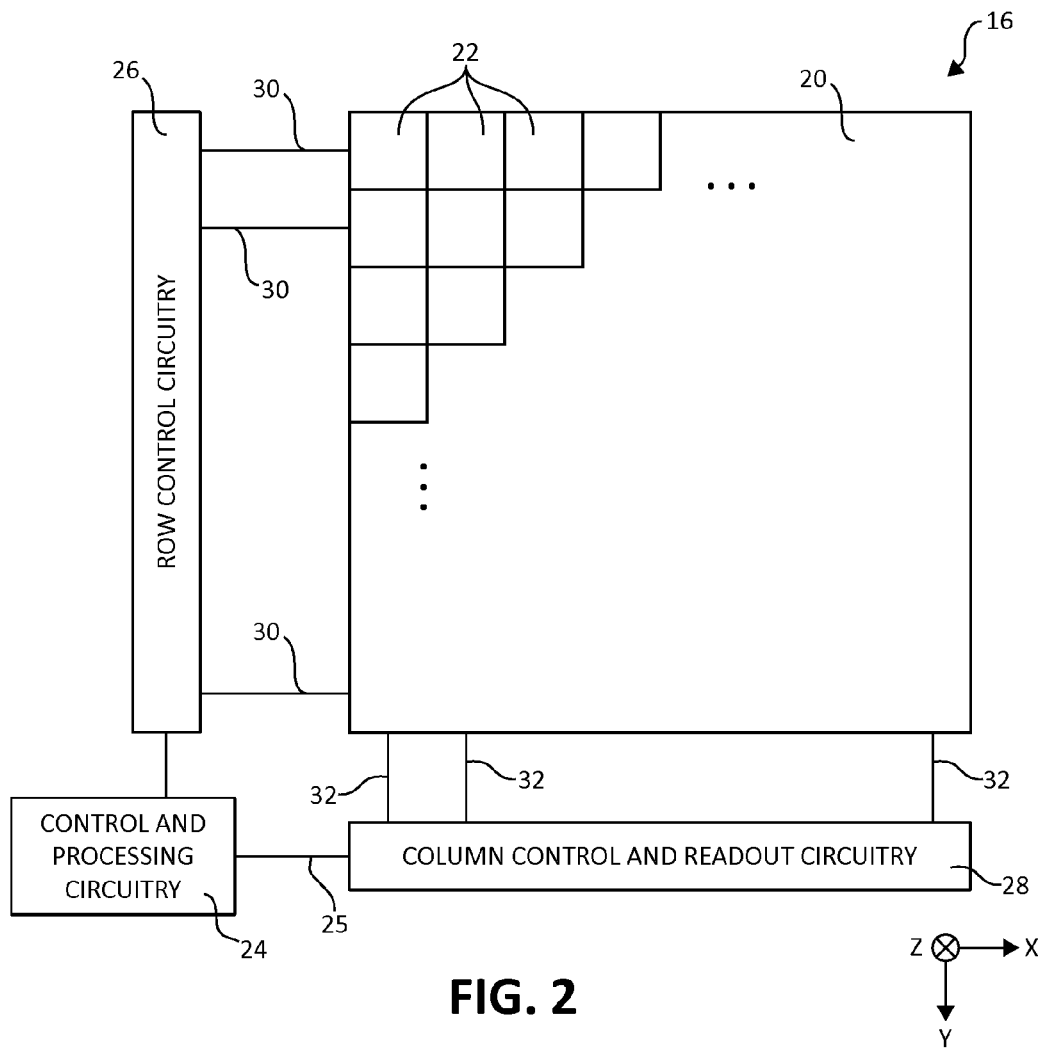
FIG. 2 is a diagram of an illustrative pixel array and associated readout circuitry for reading out image signals from the pixel array in accordance with an embodiment of the present invention.

As shown in FIG. 2, image sensor 16 may include a pixel array 20 containing image sensor pixels 22 arranged in rows and columns (sometimes referred to herein as image pixels or pixels) and control and processing circuitry 24 (which may include, for example, image signal processing circuitry). Array 20 may contain, for example, hundreds or thousands of rows and columns of image sensor pixels 22. Control circuitry 24 may be coupled to row control circuitry 26 and image readout circuitry 28 (sometimes referred to as column control circuitry, readout circuitry, processing circuitry, or column decoder circuitry). Row control circuitry 26 may receive row addresses from control circuitry 24 and supply corresponding row control signals such as reset, row-select, charge transfer, dual conversion gain, and readout control signals to pixels 22 over row control paths 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Image readout circuitry 28 may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Image readout circuitry 28 may supply digital pixel data to control and processing circuitry 24 and/or processor 18 (FIG. 1) over path 25 for pixels in one or more pixel columns.

If desired, a color filter array may be formed over photosensitive regions in array 20 so that a desired color filter element in the color filter array is formed over an upper surface of the photosensitive region of an associated pixel 22. A microlens may be formed over an upper surface of the color filter array to focus incoming light onto the photosensitive region associated with that pixel 22. Incoming light may be focused onto the photosensitive region by the microlens and may pass through the color filter element so that only light of a corresponding color is captured at the photosensitive region. If desired, an optional masking layer may be interposed between the color filter element and the microlens for one or more pixels 22 in array 20. In another suitable arrangement, an optional masking layer may be interposed between the color filter element and the photo-sensitive region for one or more pixels 22 in array 20. The masking layers may include metal masking layers or other filtering layers that block a portion of the image light from being received at the photosensitive region. The masking layers may, for example, be provided to some image pixels 22 to adjust the effective exposure level of corresponding image pixels 22 (e.g., image pixels 22 having masking layers may capture less light relative to image pixels 22 without masking layers). If desired, image pixels 22 may be formed without any masking layers.

If desired, pixels 22 in array 20 of FIG. 2 may be provided with an array of color filter elements that each pass one or more colors of light. All or some of pixels 22 may be provided with a color filter element. Color filter elements for pixels 22 may be red color filter elements (e.g., photoresist material that passes red light while reflecting and/or absorbing other colors of light), blue color filter elements (e.g., photoresist material that passes blue light while reflecting and/or absorbing other colors of light), and/or green color filter elements (e.g., photoresist material that passes green light while reflecting and/or absorbing other colors of light). Color filter elements may also be configured to filter light that is outside the visible human spectrum. For example, color filter elements may be configured to filter ultraviolet or infrared light (e.g., a color filter element may only allow infrared light or ultraviolet light to reach the photodiode). Color filter elements may configure image pixel 22 to only detect light of a certain wavelength or range of wavelengths (sometimes referred to herein as a wavelength band) and may be configured to allow multiple wavelengths of light to pass while blocking light of certain other wavelengths (for example, light having a wavelength that corresponds to a certain visible color and/or an infrared or ultraviolet wavelength).

Color filter elements that pass two or more colors of light (e.g., two or more colors of light selected from the group that includes red light, blue light, and green light) are sometimes referred to herein as "broadband" filter elements. For example, yellow color filter elements that are configured to pass red and green light and clear color filter elements that are configured to pass red, green, and blue light may be referred to herein as broadband filter elements or broadband color filter elements. Magenta color filter elements that are configured to pass red and blue light may be also be referred to herein as broadband filter elements or broadband color filter elements. Similarly, image pixels that include a broadband color filter element (e.g., a yellow, magenta, or clear color filter element) and that are therefore sensitive to two or more colors of light (e.g., that capture image signals in response to detecting two or more colors of light selected from the group that includes red light, blue light, and green light) may sometimes be referred to herein as broadband pixels or broadband image pixels. Image signals generated by broadband image pixels may sometimes be referred to herein as broadband image signals. Broadband image pixels may have a natural sensitivity defined by the material that forms the broadband color filter element and/or the material that forms the image sensor pixel (e.g., silicon). In another suitable arrangement, broadband image pixels may be formed without any color filter elements. The sensitivity of broadband image pixels may, if desired, be adjusted for better color reproduction and/or noise characteristics through use of light absorbers such as pigments. In contrast, "colored" pixel may be used herein to refer to image pixels that are primarily sensitive to one color of light (e.g., red light, blue light, green light, or light of any other suitable color). Colored pixels may sometimes be referred to herein as narrowband image pixels because the colored pixels have a narrower spectral response than the broadband image pixels.

If desired, narrowband pixels and/or broadband pixels that are not configured to be sensitive to infrared light may be provided with color filters incorporating absorbers of NIR radiation. Color filters that block near-infrared light may minimize the impact of infrared light on color reproduction in illuminants containing both visible and infrared radiation.

As an example, image sensor pixels such as the image pixels in array 20 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. However, limitations of signal to noise ratio (SNR) that are associated with the Bayer Mosaic pattern make it difficult to reduce the size of image sensors such as image sensor 16. It may therefore be desirable to be able to provide image sensors with an improved means of capturing images. In another suitable example, the green pixels in a Bayer pattern are replaced by broadband image pixels having broadband color filter elements. These examples are merely illustrative and, in general, color filter elements of any desired color and in any desired pattern may be formed over any desired number of image pixels 22.

Figure 3:
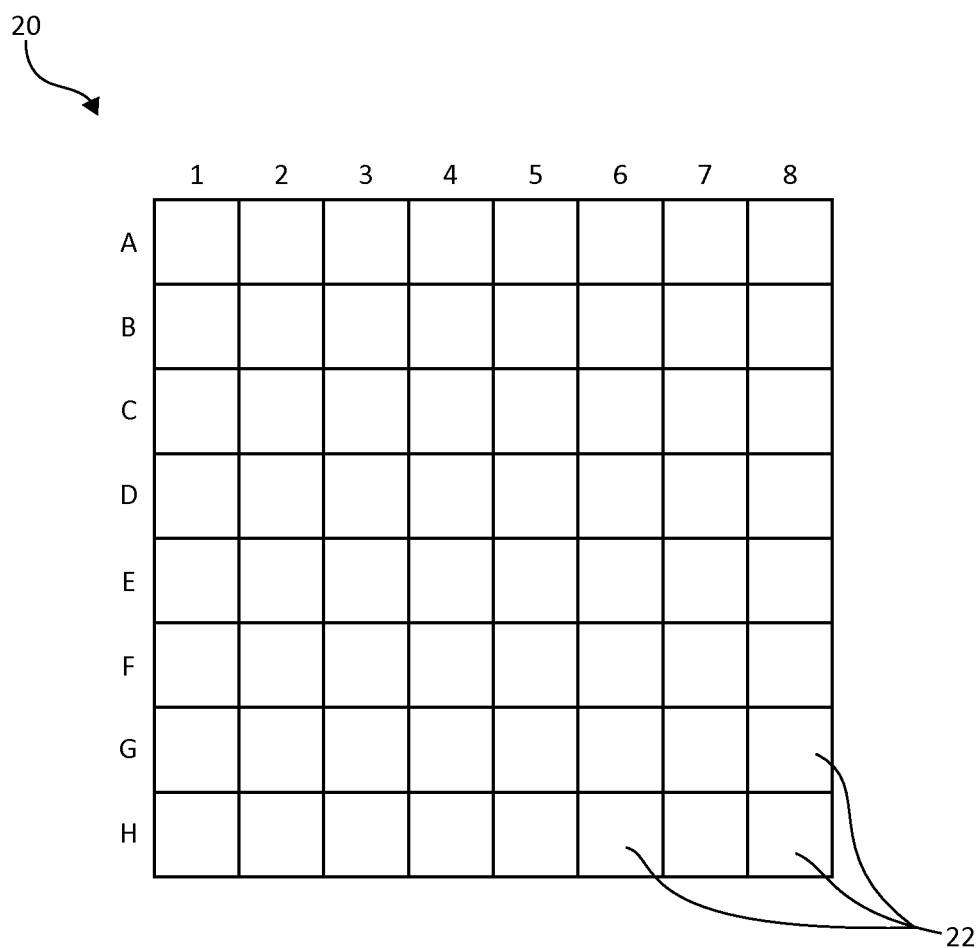
FIG. 3 is a diagram of an illustrative pixel array having image pixels arranged in rows and columns in accordance with an embodiment of the present invention.

A diagram of an illustrative pixel array 20 having image pixels 22 arranged in rows (A-H) and columns (1-8) is shown in FIG. 3. During image capture operations, each of the pixels 22 in pixel array 20 may receive light from a scene. Different amounts of image data may be available for different portions of a scene depending on, for example, the location of an object in the scene relative to the location of pixel array 20. For example, an object in a scene that is close to pixel array 20 during image capture operations may reflect and/or emit light that is received by a relatively large number of pixels 22 in array 20. Due to the relatively large number of pixels that receive light from the close-up object, a relatively large amount of image data may be available for the portion of the image in which the close-up object is located. An object in a scene that is far from pixel array 20 during image capture operations, however, may reflect and/or emit light that is received by relatively few pixels 22 in array 20. Due to the relatively small number of pixels that receive light from the distant object, a relatively small amount of image data may be available for the portion of the image in which the distant object is located.

Figure 4A:
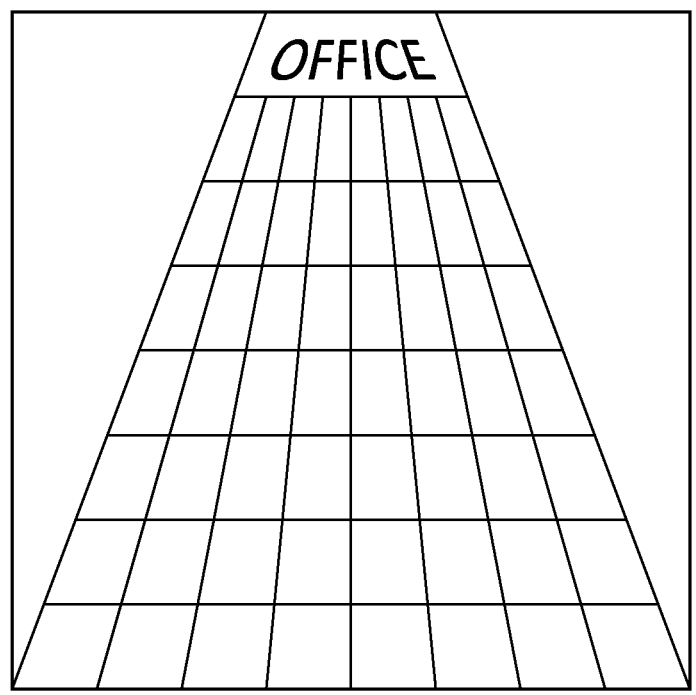
FIGS. 4A and 5A are diagrams of an illustrative original image captured by a pixel array of the type shown in FIG. 3 in accordance with an embodiment of the present invention.

An illustrative example of an image 34 that may be captured by an image pixel array 20 of the type shown and described in connection with FIG. 3 is shown in FIG. 4A. The example of FIG. 4A shows an image of a building captured from the ground (by, for example, a user operating camera module 12) looking up towards the top of the building. As shown in FIG. 4A, the lowest floors of the building (shown at the bottom of the image) were relatively close to image pixel array 20 at the time that image capture operations were performed. The highest floors of the building (shown at the top of the image) were relatively far from image pixel array 20 at the time that the image was captured. In one suitable example, an image 34 of the type shown in FIG. 4A may be captured using a wide-angle lens to increase the amount of the scene that may be captured in a single image frame (e.g., to capture all or most of the building).

Figure 4B:
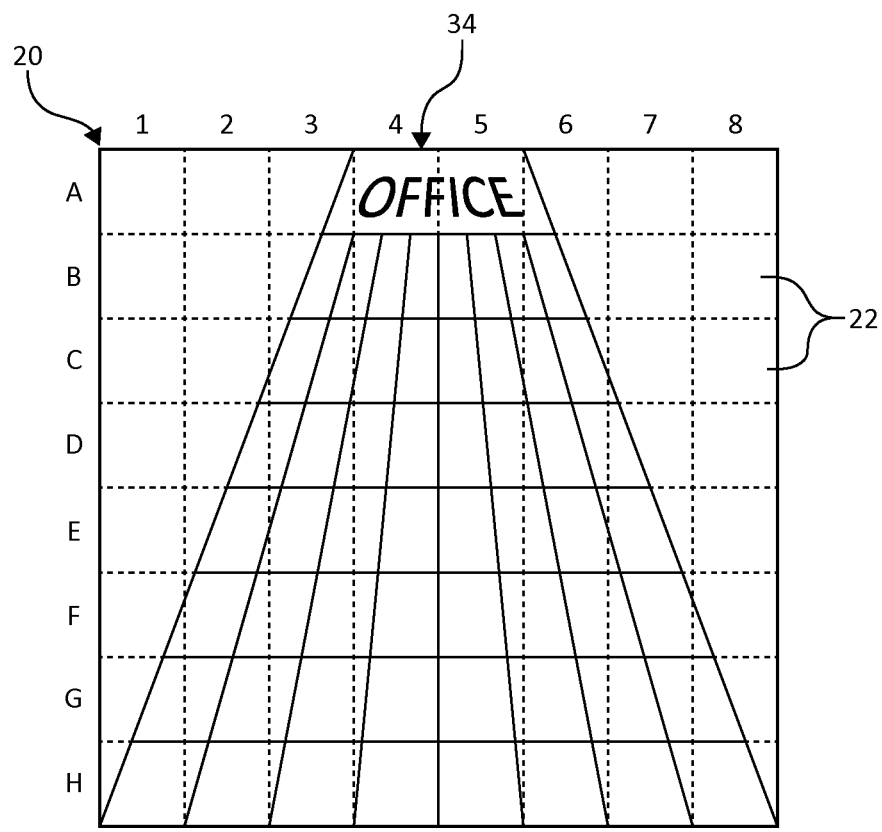
FIGS. 4B and 5B are diagrams of an image pixel array of the type shown in FIG. 3 overlaid upon an original image of the type shown in FIGS. 4A and 5A, respectively, in accordance with an embodiment of the present invention.

FIG. 4B is an illustrative schematic diagram that includes the image pixel array 20 of FIG. 3 overlaid upon the image 34 of FIG. 4A to show the respective image pixels 22 in pixel array 20 that received light from the scene captured in the image of FIG. 4A. As shown in FIG. 4B, nearly an entire row of pixels 22 in pixel array 20 (pixels H1-H8) received light from the bottom of the building and generated an electrical signal in response to the received light that was converted to image data and used to generate the image. In other words, an entire row of image pixels generated image data for the first floor of the building, resulting in a relatively large amount of image data available for this floor. FIG. 4B also shows that approximately two pixels 22 in pixel array 20 (pixels A4 and A5) received light from the top of the building and generated an electrical signal in response to the received light that was converted to image data and used to generate the image. In other words, only two image pixels generated image data for the top floor of the building, resulting in a relatively small amount of image data available for this floor of the building (even though the actual size of the top and bottom floors is substantially the same).

Image capture operations may place processing and power demands on an electronic device 10. In some suitable scenarios, it may be desirable to try to reduce the processing and power demands on an image sensor 16 and/or camera module 12 by performing modified image capture operations. In one suitable example, the electrical signals from only some of the pixels 22 in image pixel array 20 may be read out and used to generate an image in order to reduce the power and processing requirements of the image capture process. Reading out image signals from only some of the image pixels 22 in array 20 may be referred to as a skipping operation.

In a conventional skipping process, the ratio of pixels that are skipped to those that are read out is constant across the entire pixel array. Applied to the example of FIG. 4B, a conventional skipping process could result in every other pixel in rows A-H being read out, every third pixel in rows A-H being read out, one out of every ten pixels in array 20 being read out, etc. In other words, conventional skipping processes apply the same skipping ratio to the entire image pixel array regardless of the portion of the scene that each pixel in the array captured or the number of pixels that generated image data in response to light from a given portion of the scene.

In some suitable scenarios, it may be desirable to perform perspective correction operations on an image such as that shown in FIGS. 4A and 4B. In general, perspective correction operations may include applying perspective control to make all lines that are vertical in reality (e.g., in the real-world scene) vertical in the image and to make all parallel lines (e.g., horizontal edges) cross in one point. Perspective correction may be used to eliminate perspective distortion, such as the "falling away" effect that occurs when tall objects are photographed from the ground (e.g., the top of the object appears to get smaller) and/or to fill a larger portion of the image with the object (e.g., the top of a tall object may be "stretched" across the image). Because a wide-angle lens may direct more light from the edges of a scene to the image sensor than a conventional lens, perspective distortion may be particularly noticeable in images captured using a wide-angle lens. In some scenarios, it may be desirable to capture images that include light from a relatively wide field-of-view using conventional (or other) lens arrangements. Such scenarios may include digital photography or automotive applications in which it is desirable to use one or more cameras to capture a three hundred and sixty degree view around the inside or exterior of automobile (e.g., three hundred and sixty degree monitoring or surround-view imaging). Images captured in these scenarios may experience perspective distortion. It may be desirable to perform perspective correction operations on images captured using wide-view (or other) lenses to attempt to mitigate perspective distortion. If care is not taken, however, perspective correction operations may lead to additional image distortion and reduced resolution.

While conventional skipping processes may provide power and processing savings, applying a uniform skipping ratio across the entire image pixel array may result in image pixels that contribute image data of portions of the scene for which image data is scarce (e.g., far-away objects) being skipped, while image pixels that contribute image data of portions of the scene for which image data is abundant are read out. For example, applying a conventional skipping process (in which every other pixel is skipped, for example) to a pixel array 20 during the capture of the image in FIG. 4A would result in only (approximately) one image pixel in array 20 generating image data for the top floor of the building, while (approximately) four image pixels would generate image data for the bottom floor. In subsequent perspective correction operations (e.g., perspective correction operations that adjust the far-off portions of the building to their actual size), it may be difficult to generate an appropriately corrected image for the top of the building with only half of the image data that was captured for that portion of the scene being available for processing. It would therefore be desirable to be able to provide improved skipping operations for image sensors.

In one suitable example, weighted skipping operations may be used during image capture and readout operations. For example, a weighted skipping operation may include reading out image signals from a first group of image pixels in the array using a first skipping pattern and reading out image signals from a second group of pixels in the array using a second skipping pattern. If desired, using the first skipping pattern may include reading out image signals from a first percentage (subgroup) of the first group of pixels that receive light from a first portion of a scene. Using the first skipping pattern may include reading out image signals from the first subgroup without reading out image signals from pixels that are in the first group but are not in the first subgroup (e.g., reading out only image signals from the first subgroup and effectively skipping readout operations for those pixels not in the first subgroup). If desired, using the second skipping pattern may include reading out image signals from a second percentage (subgroup) of the image pixels of a second group that receive light from a second portion of the scene. Using the second skipping pattern may include reading out image signals from the second subgroup without reading out image signals from pixels that are in the second group but are not in the second subgroup (e.g., reading out only image signals from the second subgroup and effectively skipping readout operations for those pixels not in the second subgroup). The first portion of the scene may be a portion of the scene that is relatively close to the image capture device (e.g., camera module 12) and the second portion of the scene may be a portion of the scene that is relatively far from the image capture device. The first percentage may be relatively small (e.g., 10%) because there may be a relatively large amount of image data available for the first portion of the image. The second percentage may be relatively large (e.g., 90%) because there may be a relatively small amount of image data available for the second portion of the image. In other words, the first subgroup may include a first fraction of the image pixels in the first group (e.g., one out of every two, one out of every four, one out of every ten, one out of every fifteen, etc.), and the second subgroup may contain a second fraction of the image pixels in the second group (e.g., one out of every two, one out of every four, one out of every ten, one out of every fifteen, etc.). The fractions (percentages) corresponding to the first and second subgroups may be the same or different, and/or the number of pixels in first and second subgroups may be the same or different. If desired, the number of pixels in each of the first and second groups may be the same or different (e.g., the first and second groups may correspond to different portions of the scene). Skipping operations and processing operations (e.g., perspective correction processing) may have to vary with field position in order to contain image artifacts.

In one suitable example, a pixel array may have top area (e.g., upper portion) in which image signals from every pixel are read out to generate an image, a middle area (e.g., center portion) in which image signals from (only) every other pixel are read out to generate the image, and a lower area (e.g., bottom portion) from which image signals from (only) one in every fifteen image pixels are read out to generate the image. Such an arrangement may be useful, for example, in generating images with one or more image capture devices that may be combined or presented together to give a view of the area surrounding an object (e.g., a three hundred and sixty degree view around an automobile).

In another suitable arrangement, a pixel array may have left and right regions (e.g., peripheral sections) in which image pixel signals from every image pixel are read out to generate an image and a middle region (e.g., center section) in which image signals from (only) one in every two image pixels are read out to generate the image. Such an arrangement may be useful, for example, in wide-angle image capture operations with a digital camera.

Although some of the examples described herein are explained in the context of two groups of pixels each having a corresponding subgroup, this is merely illustrative. If desired, a pixel array may include two, three, four or more groups of image pixels. Each group may have a corresponding subgroup (e.g., first, second, third, and fourth subgroups) of pixels from which image signals are read out, while image signals from pixels not included in a subgroup may not be read out. For example, image signals may be read out from only the image pixels in the group that are also included in the given subgroup without reading out the image signals from image pixels in the group that are not in the given subgroup. The skipping ratio (a pattern, percentage, fraction, portion, or part) of the image pixels in the group that are skipped may be the same or different for each group. The skipping ratio (sometimes referred to herein as a skipping pattern) may be changed as desired. In one suitable scenario, a user may be able to select the various groups into which the image pixel array is to be divided and select corresponding skipping ratios for each group. If desired, the regions and skipping ratios may be pre-programmed based on the type of image capture mode (e.g., a wide-angle image capture mode may correspond to pre-set regions and skipping ratios), or the groups and subgroups may be determined based on the scene that is being captured in the image. For example, an image sensor may use some or all of the pixels in the array (e.g., in a low-power mode in which only some of the pixels are active) to generate first image signals in response to light from a scene, process the first image signals to determine the amount of available image data in various portions of the scene, and adjust the skipping patterns that are used to read out pixels in various portions of the array based on the processing. In this way, an appropriate number of image pixels may be used to generate image signals that are read out for the various portions of the scene.

In the example of FIG. 4B, a weighted skipping operation as described above may include reading out image signals from one out of every four pixels in rows E-H (e.g., rows that contain image pixels that receive light from portions of the image that are relatively close to the pixel array and for which there is therefore a relatively large amount of image data available) and reading out one out of every two pixels in rows A-D (e.g., rows that contain image pixels that receive light from portions of the image that are relatively close to the pixel array and for which there is therefore a relatively small amount of image data available).

If desired, the weighted skipping operation may be performed such that one pixel in columns 1 through 4 and one pixel in columns 5 through 8 is read out in each of rows E-H (e.g., rows corresponding to a first portion of the image). For example, pixels E1 and E5 may be read out in row E, pixels F2 and F6 may be read out in row F, pixels G3 and G7 may be read out in row G, and pixels H4 and H7 may be read out in row H. If desired, pixels E1 and E2 may be read out in row E, pixels F3 and F4 may be read out in row F, pixels G5 and G6 may be read out in row G, and pixels H7 and H8 may be read out in row H. If desired, readout operations for the remaining pixels in rows E-H may be skipped. In one suitable arrangement, all of the pixels in rows E and G may be read out, while none of the pixels in rows F and H may be read out (or vice-versa). If desired, only pixels in given columns may be read out. For example, only pixels in columns 3 and 6 (or any other desired columns) may be read out for rows E-H, while no image pixels in the remaining columns may be read out (e.g., the remaining columns may be skipped). In one suitable arrangement, some or all of the pixels in a given row may be skipped. For example, only pixels in rows E and G, rows F and H, rows G, F, and E, or any other suitable combination of rows may be read out without reading out any image signals from selected other rows in a given part of the array. In general, the skipping ratio for a first portion of the image may be one to two, one to ten, one to fifteen, one to one hundred, or any other suitable ratio.

If desired, the weighted skipping operation may be performed such that every other pixel in each of rows A-D (e.g., rows corresponding to a second portion of the image) is read out. If desired, the remaining pixels (e.g., those pixels that are not read out) may be skipped. For example, pixels A1, A3, A5, and A7 may be read out in row A, pixels B2, B4, B6, and B8 may be read out in row B, pixels C1, C3, C5, and C7 may be read out in row C, and pixels D2, D4, D6, and D8 may be read out in row D. etc. If desired, four adjacent pixels in each row may be read out. For example pixels A2-A4 may be read out in row A, pixels B2-B4 may be read out in row B, pixels C2-C4 may be read out in row C, and pixels D2-D4 may be read out in row D. If desired, every image pixel in rows A-D may be read out. In one suitable arrangement, only pixels in rows A and C, rows B and D, rows A, B, and D, or any other suitable combination of rows may be read out without reading out any image signals from selected other rows in the array (e.g., the selected other rows may be skipped). In one suitable arrangement, image signals for every other column in rows A-D may be read out (e.g., columns 1, 3, 5, and 7) and/or only image signals from selected columns may be read out (e.g., only columns 4 and 5). In general, the skipping ratio for a second portion of the image may be one to two, one to ten, one to fifteen, one to one hundred, or any other suitable ratio.

While specific skipping patterns and ratios are discussed above, these arrangements are merely illustrative. Although the above examples have been explained using an eight-by-eight pixel array, skipping operations may be performed with pixel arrays including a larger number (e.g., thousands or millions) of image sensor pixels. In other words, the numbers and sizes of the pixel arrays, pixels, regions/portions of the image sensors, and scenarios described above are merely exemplary and may not be shown and/or described on the same scale as arrangements that may be employed in practice. The examples described above in which two different skipping ratios are used for two different portions of an image are merely illustrative. If desired, three different skipping ratios may be used for three different portions of an image sensor (that generate different amounts of available image data, for example), four different skipping ratios may be used for four different portions of an image sensor, etc. If desired, each of the portions of the image sensor may contain the same or a different number of pixels. In general, any suitable skipping ratios may be used in any suitable combination for any portion(s) of an image in any suitable configuration or arrangement.

Using weighted skipping operations such as those described above, image data may be read out from an adequate number of pixels to obtain sufficient image data for the various regions. For example, image signals may be read out from each of the pixels in columns 3-6 in rows A-D (e.g., 50% of the pixels in this region of the image) in the example of FIG. 4B. In this way, substantially all of the image data for the top of the building may be read out (e.g., most or all of the available image data for a portion of the image for which data is scarce is read out). In such a scenario, image signals may be read out from pixels in columns 3 and 6 in each of rows E-H. In this way, excess power and processing is not expended to read out image signals for portions of the image in which image data is abundant, while still providing sufficient image data to generate an image.

Figure 4C:
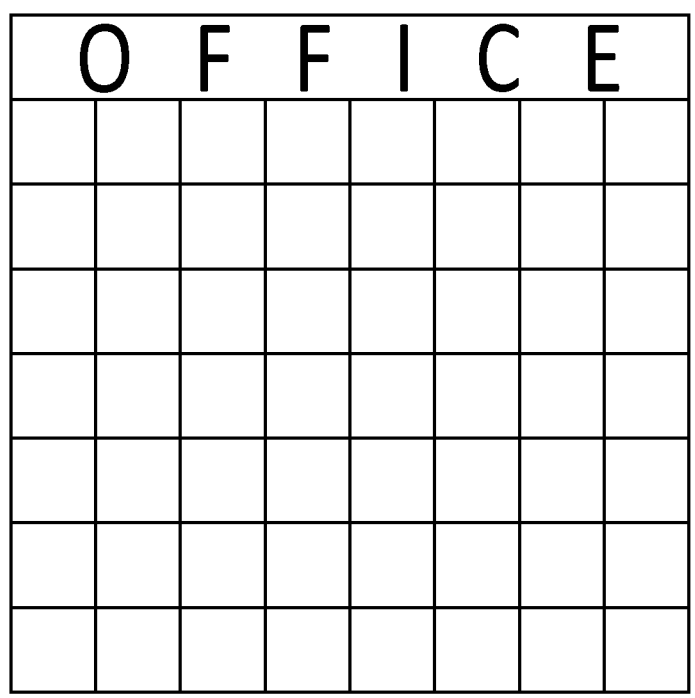
FIGS. 4C and 5C are diagrams of an illustrative corrected image generated by applying perspective correction operations to images of the types shown in FIGS. 4A and 5A, respectively, in accordance with an embodiment of the present invention.

Perspective correction operations may be performed on an image captured using weighted skipping operations as described above. An example of a corrected image generated using perspective correction operations on an image captured using weighted skipping operations is shown in FIG. 4C, which shows that a perspective-corrected image 36 may be generated using image data from only a fraction of the pixels in the array. Because substantially all of the image data for the top of the building is read out, the top of the building can be reproduced in the perspective-corrected image with relatively high resolution (e.g., enough of the available image data from this portion of the image is read out to permit "stretching" or other modifications to the image data during perspective correction operations). Although only a fraction of the image data for the bottom of the building is read out, the abundance of image data in this portion of the image allows for this reduced readout to be used to produce a perspective corrected-image having a resolution that is at least comparable to the resolution of the top of the building. In this way, an imaging device may generate perspective-corrected images (such as image 36) in a power and processing-efficient manner.

Figure 5A:
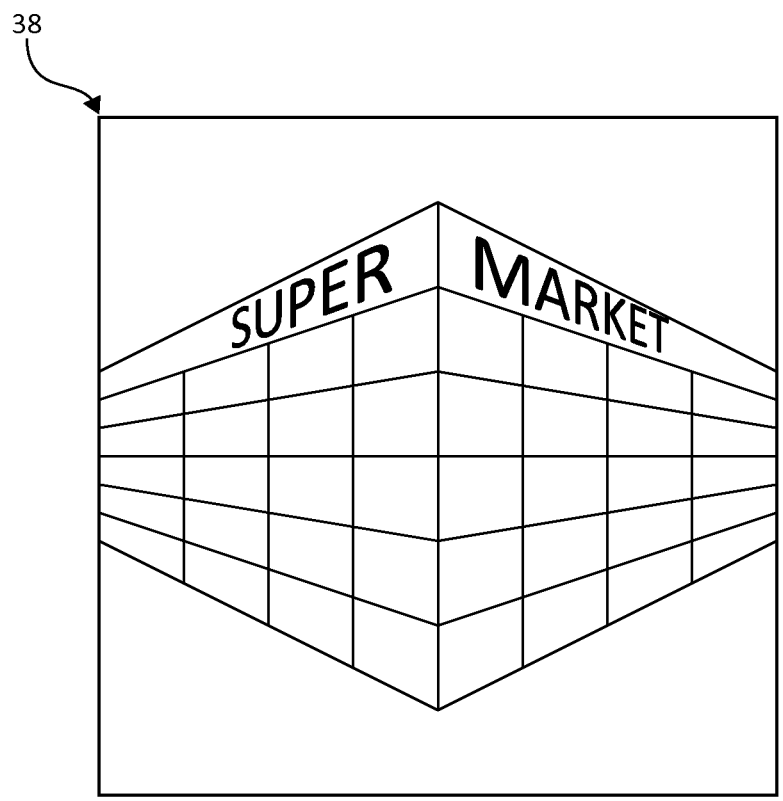

FIG. 5A shows an illustrative image 38 of a building captured from a corner of the building (by, for example, a user operating camera module 12) looking down along two sides of the building. As shown in FIG. 5A, the corner of the building (shown at the middle of the image) was relatively close to image pixel array 20 at the time of that image capture operations were performed. The walls of the building that extend to either side and to the rear of the corner (e.g., into the page, shown as the portions of the building extending to the left and to the right, respectively, in the image) were increasingly far from image pixel array 20 at the time of image capture. In one suitable example, the image 38 of FIG. 5A may be captured using a wide-angle lens to increase the amount of the scene that may be captured in a single image frame (e.g., to capture a greater portion of the walls extending from the corner, as shown in FIG. 5A).

Figure 5B:
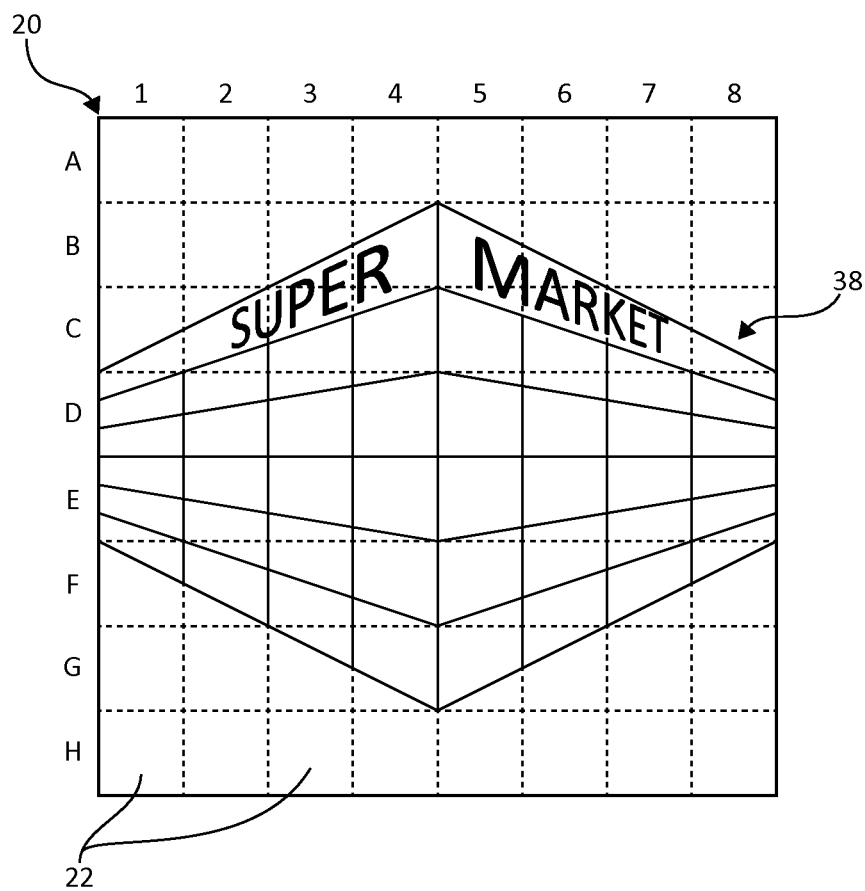

FIG. 5B is an illustrative schematic diagram that includes the image pixel array 20 of FIG. 3 overlaid upon the image 38 of FIG. 5A to show the respective image pixels 22 in pixel array 20 that received light from the scene captured in the image of FIG. 5A. As shown in FIG. 5B, nearly an entire column of pixels 22 in pixel array 20 (column 4) received light from the left side of the corner building and generated an electrical signal in response to the received light that was converted to image data and used to generate the image. In other words, nearly an entire row of image pixels generated image data for the left side of the corner portion of the building. That is, there is a relatively large amount of image data available for left side of the corner of the building. FIG. 5B also shows that approximately two pixels 22 in pixel array 20 (pixels D1 and E1) received light from the leftmost portion building and generated an electrical signal in response to the received light that was converted to image data and used to generate the image. That is, there is a relatively small amount of image data available for the leftmost portion of the building), even though the actual sizes of the left corner portion and the leftmost portion of the building are substantially identical.

Applied to the example of FIG. 5B, such a conventional skipping process (as described above) would result in every other pixel in columns 1-8 being read out, every third pixel in columns 1-8 being read out, one out of every ten pixels in array 20 being read out, etc. (as examples). In other words, conventional skipping processes may result in image pixels that contribute image data FOR portions of the scene for which image data is scarce (e.g., far-away objects) being skipped, while image pixels that contribute image data of portions of the scene for which image data is abundant are read out.

For example, applying a conventional skipping process (in which every other pixel is skipped, for example) to a pixel array 20 during the capture of the image in FIG. 5A would result in only (approximately) one image pixel in array 20 generating image data for the leftmost portion of the building, while (approximately) three image pixels would generate image data for the portion of the building adjacent to the corner. In subsequent perspective correction operations (e.g., perspective correction operations that adjust the far-off portions of the building to their actual size), it may be difficult to generate an appropriately corrected image for the leftmost portion of the building with only half of the image data that was captured for that portion of the scene being available for processing. It may therefore be desirable to apply weighted skipping methods (such as those described above in connection with FIGS. 4A-4C) when capturing images of the type shown in FIG. 5A.

In the example of FIG. 5B, a weighted skipping operation may include reading out image signals from one out of every four pixels in columns 3-6 (e.g., columns that contain image pixels that receive light from portions of the image that are relatively close to the pixel array and for which there is therefore a relatively large amount of image data available) and reading out one out of every two pixels in columns 1, 2, 7, and 8 (e.g., columns that contain image pixels that receive light from portions of the image that are relatively close to the pixel array and for which there is therefore a relatively small amount of image data available).

If desired, the weighted skipping operation may be performed such that one pixel in rows A-D and one pixel in rows E-H is read out in each of columns 3-6 (e.g., columns corresponding to a first portion of the image). For example, pixels D3 and E3 may be read out in column 3, pixels B4 and G4 may be read out in column 4, pixels C5 and F5 may be read out in column 5, and pixels D6 and F6 may be read out in column 6. If desired, pixels C3 and D3 may be read out in column 3, pixels E4 and F4 may be read out in column 4, pixels C5 and F5 may be read out in column 5, and pixels E6 and F6 may be read out in column 6. In one suitable arrangement, pixels in some rows of columns 3-6 may be read out, while others are skipped. For example, pixels in rows A, C, E, and G of columns 3-6 may be read out, while pixels in rows B, D, F, and H may be skipped (or vice versa). If desired, pixels in of columns 3-6 may be read out, while others are skipped. For example, pixels in columns 4 and 5 may be read out, while pixels in columns 3 and 6 may be skipped (or vice versa). In general, the skipping ratio for a first portion of the image may be one to two, one to ten, one to fifteen, one to one hundred, or any other suitable ratio.

If desired, the weighted skipping operation may be performed such that every other pixel in each of columns 1, 2, 7, and 8 (e.g., columns corresponding to a second portion of the image) is read out. For example, pixels A1, C1, E1, and G1 may be read out in column 1, pixels B2, D2, F2, and H2 may be read out in column 2, pixels A7, C7, E7, and G7 may be read out in column 7, and pixels B8, D8, F8, and H8 may be read out in column 8. If desired, four adjacent pixels in each row may be read out. For example pixels C1-F1 may be read out in column 1, pixels C2-F2 may be read out in column 2, pixels C7-F7 may be read out in column 7, and pixels C8-F8 may be read out in column 8. In one suitable arrangement, every pixel in rows 1, 2, 7, and 8 may be read out. If desired, pixels in rows A, C, E, and G of columns 1, 2, 7, and/or 8 may be read out, while pixels in rows B, D, F, and H are skipped (or vice versa). In one suitable arrangement, pixels in columns 1 and 7 may be read out, while pixels in columns 2 and 8 may be skipped (or vice versa). In general, the skipping ratio for a first portion of the image may be one to two, one to ten, one to fifteen, one to one hundred, or any other suitable ratio.

While specific skipping patterns and ratios are discussed above, these arrangements are merely illustrative. Although the above examples have been explained using an eight-by-eight pixel array, skipping operations may be performed using pixel arrays including a larger number (e.g., thousands or millions) of image sensor pixels. In other words, the numbers and sizes of the pixel arrays, pixels, regions/portions of the image sensors, and scenarios described above are merely exemplary and may not be shown/described on the same scale as arrangements that may be employed in practice. The examples described above in which two different skipping ratios are used for two different portions of an image are merely illustrative. If desired, three different skipping ratios may be used for three different portions of an image sensor (that generate different amounts of available image data, for example), four different skipping ratios may be used for four different portions of an image sensor, etc. If desired, each of the portions of the image sensor may contain the same or a different number of pixels. In general, any suitable skipping ratios may be used in any suitable combination for any portion(s) of an image in any suitable configuration or arrangement.

Using weighted skipping operations such as those described above, image data may be read out from an adequate number of pixels to obtain sufficient image data for the various regions of the scene. For example, image signals may be read out form each of the pixels in columns rows C-D in columns 1, 2, 7, and 8 (e.g., 50% of the pixels in the left- and right-most regions of the image) in the example of FIG. 5B. In this way, substantially all of the image data for the left- and right-most portions the building may be read out (e.g., most or all of the available image data for a portion of the image for which data is scarce is read out). In such a scenario, image signals may be read out from pixels in rows C and F in each of rows columns 3-6. In this way, excess power and processing is not expended to read out image signals for portions of the image in which image data is abundant, while still providing sufficient image data to generate an image.

Figure 5C:
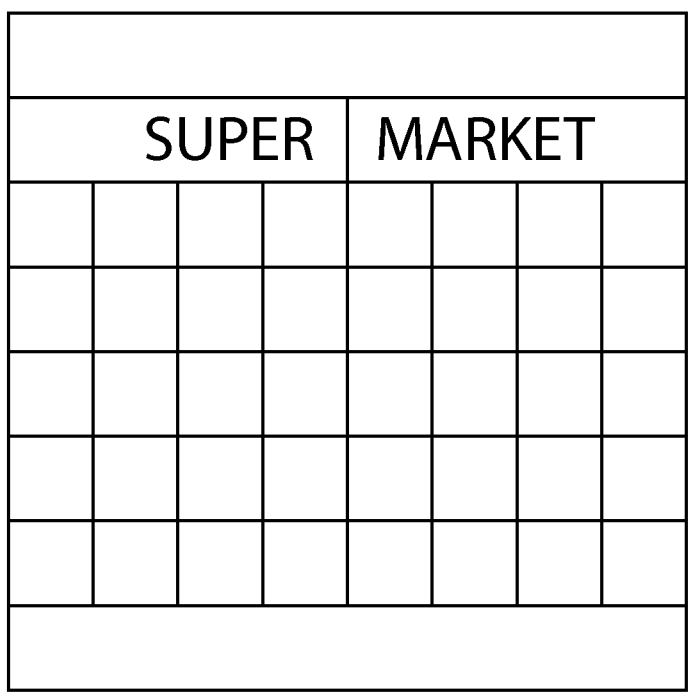

In some suitable scenarios, it may be desirable to perform perspective correction operations on an image 38 such as that shown in FIG. 5A. An example of a corrected image 40 generated using perspective correction operations on an image captured using weighted skipping is shown in FIG. 5C, which shows that a perspective-corrected image 40 may be generated using image data from only a fraction of the pixels in the array. Because substantially all of the image data for the left and right-most portions of the building is read out, the left and right-most portions of the building can be reproduced in the perspective-corrected image with relatively high resolution (e.g., enough of the available image data from this portion of the image is read out to permit "stretching" or other modifications to the image data during perspective correction operations). Although only a fraction of the image data for the corner of the building is read out, the abundance of image data in this portion of the image allows for this reduced readout to be used to produce a perspective corrected image having a resolution that is at least comparable to the resolution of the left and right-most portions of the building. In this way, an imaging device may generate perspective-corrected images in a power and processing-efficient manner.

The exemplary skipping operations described above in which some pixels 22 in array 20 are skipped while other pixels 22 in array 20 are read out is merely illustrative. If desired, binning (combining) operations may be used in addition to and/or in place of skipping operations. In general, binning operations may include combining signals (image data) that is read out from multiple pixels into a single binned (combined) signal. By binning image signals from multiple pixels, processing/and or readout processes may be simplified to require less power. Because binning operations may include reading out electrical signals (e.g., generating image pixel signals and/or digital image data) for a substantial portion of the pixels 22 in array 20 (e.g., all of the pixels in the array), binning operations may provide more image data for processing (e.g., perspective correction operations) and higher quality final images when compared to skipping operations (which only read out/generate image data for a fraction of the pixels in the array).

In one suitable arrangement, binning operations may include transferring electrical signals from multiple pixels 22 in array 20 to a common floating diffusion (FD) node. Referring back to the example of FIG. 3, for example, a binning process may include generating an electrical signal in response to light received from a scene with each image pixel 22 in array 20. Electrical signals from multiple pixels may then be transferred to a shared floating diffusion node to generate a combined signal. For example, the electrical signals from pixels A1, A2, B1, and B2 may be transferred to and simultaneously stored on a shared floating diffusion node to generate a combined electrical signal. The combined electrical signal may then be read out from the shared floating diffusion node and processed (e.g., using perspective correction processing operations). In such an example, the number of signals that must be read out and processed is reduced by a factor of four, which may reduce power and processing demands associated with image capture and processing operations. Binning operations such as these may be described as analog binning operations because the signals are combined in the analog domain (e.g., before the signals are read out and converted to digital signals by ADCs in column control and readout circuitry 28 or other suitable processing circuitry).

If desired, binning operations may be performed digitally. For example, digital binning operations may include reading out electrical signals from each image pixel 22 in array 20 that receives light from (and generates an electrical signal in response to) light in a scene. The electrical signals may then be read out from each pixel and converted to respective digital signals (e.g., image data) by ADCs in pixel control and readout circuitry 28. Prior to subsequent processing steps, digital image data that originated from multiple pixels may be combined (binned) into a single combined digital image data signal. Referring back to the example of FIG. 3, for example, binning operations may include combining digital image data that originated from pixels A1, C1, E1, and F1into a single combined digital image signal. Binning operations such as these may be performed by column control and readout circuitry 28, control and processing circuitry 24, or other suitable processing circuitry in electronic device 10 (e.g., image signal processing circuitry). The combined digital image data may then be subsequently processed (e.g., using perspective correction processing operations) by column control and readout circuitry 28, control and processing circuitry 24, or other suitable processing circuitry in electronic device 10 (or processing circuitry that is separate from electronic device 10). In such an example, the number of signals that must be processed is reduced by a factor of four, which may reduce power and processing demands associated with image capture and processing operations. Binning operations such as these may be described as digital binning operations because the signals are combined in the digital domain (e.g., after the signals are read out and converted to digital signals by ADCs in column control and readout circuitry 28 or other suitable processing circuitry).

In a conventional binning process, the number of pixels from which image signals are combined to generate a combined image signal is constant across the entire pixel array. Applied to the example of FIG. 4B, such a conventional skipping process could result in image signals from groups of four pixels being binned, image signals from groups of two image pixels being binned, image signals from alternating image pixels in a common row or column being binned, etc. In other words, conventional skipping processes apply the same binning factor to the entire image pixel array regardless of the portion of the scene that each pixel in the array captured or the number of pixels that generated image data in response to light from a given portion of the scene.

While conventional binning processes may provide power and processing savings, applying a uniform binning factor across the entire image pixel array may result in image pixels that contribute image data of portions of the scene for which image data is scarce (e.g., far-away objects) being binned at the same rate as image pixels that contribute image data for portions of the scene for which image data is abundant. For example, applying a conventional binning process (in which groups of four pixels are binned, for example) to a pixel array 20 during the capture of the image in FIG. 4B would result in only two combined image pixel signals for the top two floors of the building (e.g., if pixels A3, A4, B3, and B4 were binned, and pixels A5, A6, B5, and B6 were binned), while four combined image pixel signals would be generated for the bottom floor (e.g., if pixels G1, G2, H1, and H2 were binned, pixels G3, G4, H3, and H4 were binned, pixels G5, G6, H5, and H6 were binned, and pixels G7, G8, H7, and H8 were binned). In subsequent perspective correction operations (e.g., perspective correction operations that adjust the far-off portions of the building to their actual size), it may be difficult to generate an appropriately corrected image for the top of the building with a limited number of combined image signals. It would therefore be desirable to be able to provide improved binning operations for image sensors.

In one suitable example in accordance with an embodiment of the present invention, weighted binning operations may be used during image capture operations. For example, a weighted binning operation may include binning image signals from the pixels that receive light from a first portion of a scene into first pixel groups having a first number of pixels in each group and binning image signals from the image pixels that receive light from a second portion of the scene into second pixel groups having a second number of pixels. The first portion of the scene may be a portion of the scene that is relatively close to the image capture device (e.g., camera module 12) and the second portion of the scene may be a portion of the scene that is relatively far from the image capture device. The number of pixels in the first groups may be relatively large (e.g., four pixels) because there may be a relatively large amount of image data available for the first portion of the image. The number of pixels in the second groups may be relatively small (e.g., two pixels) because there may be a relatively small amount of image data available for the second portion of the image. Binning operations and processing operations (e.g., perspective correction processing) may have to vary with field position in order to contain image artifacts.

In the example of FIG. 4B, a weighted binning operation as described above may include binning image signals from groups of four image pixels in a first region of the pixel array such as rows E-H (e.g., rows that contain image pixels that receive light from portions of the image that are relatively close to the pixel array and for which there is therefore a relatively large amount of image data available) and binning image signals from groups of two pixels in a second region of the pixel array such as rows A-D (e.g., rows that contain image pixels that receive light from portions of the image that are relatively close to the pixel array and for which there is therefore a relatively small amount of image data available).

In one illustrative example, pixels E1, E2, F1, and F2 may be binned to generate a combined image signal, pixels E3, E4, F3, and F4 may be binned to generate a combined image signal, pixels G1, G2, H1, and H2 may be binned to generate a combined image signal, pixels G3, G4, H3, and H4 may be binned to generate a combined image signal, etc. If desired, similar binning operations may be performed for all pixels in rows E-H. In such an example, eight combined image signals would result from the binning operations of rows E-H.

If desired, pixels A1 and B1 may be binned to generate a combined image signal, pixels A2 and B2 may be binned to generate a combined image signal, pixels A3 and B3 may be binned to generate a combined image signal, pixels A4 and B4 may be combined to generate a combined image signal, pixels C1 and D1 may be binned to generate a combined image signal, pixels C2 and D2 may be binned to generate a combined image signal, pixels C3 and D3 may be binned to generate a combined image signal, pixels C4 and D4 may be combined to generate a combined image signal, etc. If desired, similar binning operations may be performed for all pixels in rows A-D. In such an example, sixteen combined image signals would result from the binning operations of rows A-D.

While specific binning patterns and factors (ratios) are discussed above, these arrangements are merely illustrative. Although the above examples have been explained using an eight-by-eight pixel array, binning operations may be performed with pixel arrays including a larger number (e.g., thousands or millions) of image sensor pixels. In other words, the numbers and sizes of the pixel arrays, pixels, regions/portions of the image sensors, and scenarios described above are merely exemplary and may not be shown and/or described on the same scale as arrangements that may be employed in practice. The examples described above in which two different binning factors are used for two different portions of an image are merely illustrative. If desired, three different binning factors may be used for three different portions of an image sensor (that generate different amounts of available image data, for example), four different binning factors may be used for four different portions of an image sensor, etc. If desired, each of the portions of the image sensor may contain the same or a different number of pixels. In general, any suitable binning patterns may be used in any suitable combination for any portion(s) of an image in any suitable configuration or arrangement.

Using weighted binning operations such as those described above, an adequate number of combined image signals may be generated to obtain sufficient image data for the various regions of the scene. For example, image signals from groups of two pixels in rows A-D may be binned in the example of FIG. 4B. In this way, substantially all of the image data for the top of the building may be read out (e.g., most or all of the available image data for a portion of the image for which data is scarce is read out). In such a scenario, image signals from groups of four pixels each of rows E-H may be binned. In this way, excess power and processing is not expended to read out a large number of combined image signals for portions of the image in which image data is abundant and/or redundant, while still providing sufficient image data to generate an image. If desired, perspective correction processing may be performed on the image to generate a perspective-corrected image 36 of the type shown in FIG. 4C. Because a relatively large number of combined image signals are generated by the binning operation for the portions of the image for which image data is scarce (e.g., the top of the building), perspective correction processes may be able to better maintain the resolution of these portions when generating the corrected image.

In the example of FIG. 5B, a weighted binning operation may include binning image signals from groups of eight pixels in a first section of an image sensor pixel array such as columns 3-6 (e.g., columns that contain image pixels that receive light from portions of the image that are relatively close to the pixel array and for which there is therefore a relatively large amount of image data available) and binning image signals from groups of four pixels in a second section of an image sensor such as columns 1, 2, 7, and 8 (e.g., columns that contain image pixels that receive light from portions of the image that are relatively far from the pixel array and for which there is therefore a relatively small amount of image data available).

In one suitable example, the weighted skipping operation may be performed such image signals from pixels A1, A2, B1, and B2 are combined to generate a combined image signal, image signals from pixels C1, C2, D1, and D2 are combined to generate a combined image signal, image signals from pixels A7, A8, B7, and B8 are combined to generate a combined image signal, image signals from pixels C7, C8, D7, and D8 are combined to generate a combined image signal, etc. If desired, a binning operation of this sort may be carried out for all of the pixels in columns 1, 2, 7, and 8. In such an example, eight combined image signals would be generated for the pixels in columns 1, 2, 7, and 8.

If desired, the weighted skipping operation may include binning all of the image signals generated by the pixels in column 3 to generate a combined image signal, binning all of the image signals generated by the pixels in column 4 to generate a combined image signal, binning all of the image signals generated by the pixels in column 5 to generate a combined image signal, and binning all of the image signals generated by the pixels in column 6 to generate a combined image signal (as examples). In such an example, four combined image signals would be generated for the pixels in columns 3-6.

Using weighted binning operations such as those described above, an adequate number of combined image signals may be generated to obtain sufficient image data for the various regions of the scene. For example, image signals from every pixel in columns 1, 2, 7, and 8 may have their own bin (e.g., no binning may occur) in the example of FIG. 5B. In this way, substantially all of the image data for the left- and right-most portions of the building may be read out (e.g., most or all of the available image data for a portion of the image for which data is scarce is obtained with little or no reduction in resolution). In such a scenario, image signals from groups of four pixels in each of columns 3-6 may be binned. In this way, excess power and processing is not expended to read out a large number of combined image signals for portions of the image in which image data is abundant and/or redundant, while still providing sufficient image data to generate an image. If desired, perspective correction processing may be performed on the image to generate a perspective-corrected image 40 of the type shown in FIG. 5C. Because a relatively large number of combined image signals are generated by the binning operation for the portions of the image for which image data is scarce (e.g., the left and right-most sides of the building), perspective correction processes may be able to better maintain the resolution of these portions when generating the corrected image.

While specific binning patterns and factors (ratios) are discussed above, these arrangements are merely illustrative. Although the above examples have been explained using an eight-by-eight pixel array, binning operations may be performed with pixel arrays including a larger number (e.g., thousands or millions) of image sensor pixels. In other words, the numbers and sizes of the pixel arrays, pixels, regions/portions of the image sensors, and scenarios described above are merely exemplary and may not be shown and/or described on the same scale as arrangements that may be employed in practice. The examples described above in which two different binning factors are used for two different portions of an image are merely illustrative. If desired, three different binning factors may be used for three different portions of an image sensor (that generate different amounts of available image data, for example), four different binning factors may be used for four different portions of an image sensor, etc. If desired, each of the portions of the image sensor may contain the same or a different number of pixels. In general, any suitable binning patterns may be used in any suitable combination for any portion(s) of an image in any suitable configuration or arrangement.

Figure 6:
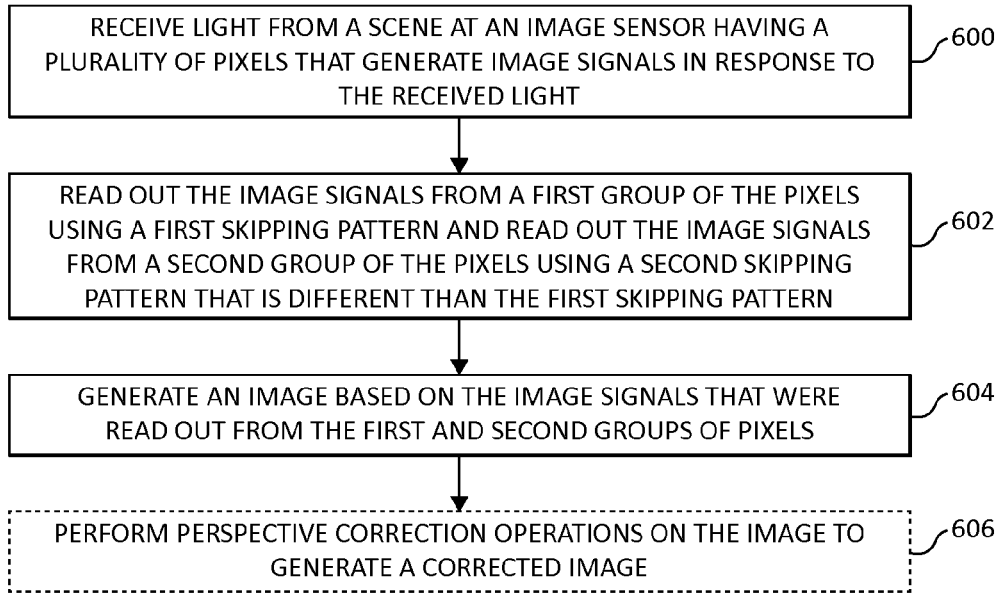
FIG. 6 is a flow chart of illustrative steps that may be performed in generating an image using a weighted skipping pixel readout method in accordance with an embodiment of the present invention.

A flow chart of illustrative steps that may be performed in generating an image using a weighted skipping method as described above in connection with FIGS. 4A-C and 5A-C is shown in FIG. 6.

At step 600, an image sensor that includes an image pixel array having a plurality of pixels may receive light from a scene. The pixels may generate electrical image pixel signals in response to the received light.

At step 602, image signals from a first group of the pixels may be read out using a first skipping pattern (e.g., a first percentage of the pixels that captured light from a first portion of the scene may be read out without reading out the image pixels not included in the first percentage). Image signals from a second group of the pixels may be read out using a second skipping pattern that is different than the first skipping pattern (e.g., a second percentage of the pixels that captured light from a second portion of the scene may be read out without reading out the image pixels not included in the second percentage). The first portion of the scene may be relatively close to the image sensor, and the second portion of the scene may be relatively far from the image sensor. The first percentage may be less than the second percentage. In other words, a greater fraction of the image sensor pixels that generated image signals for a portion of the scene for which image data is scarce may be read out, while a lesser fraction of the image sensor pixels that generated image signals for a portion of the scene for which image data is abundant may be read out.

At step 604, processing circuitry may generate an image based on the image signals that were read out from the first and second groups of pixels.

At optional step 606, processing circuitry may perform perspective correction operations on the image to generate a perspective-corrected image (of the type shown in FIGS. 4C and/or 5C, for example). If desired, step 606 may be omitted.

Figure 7:
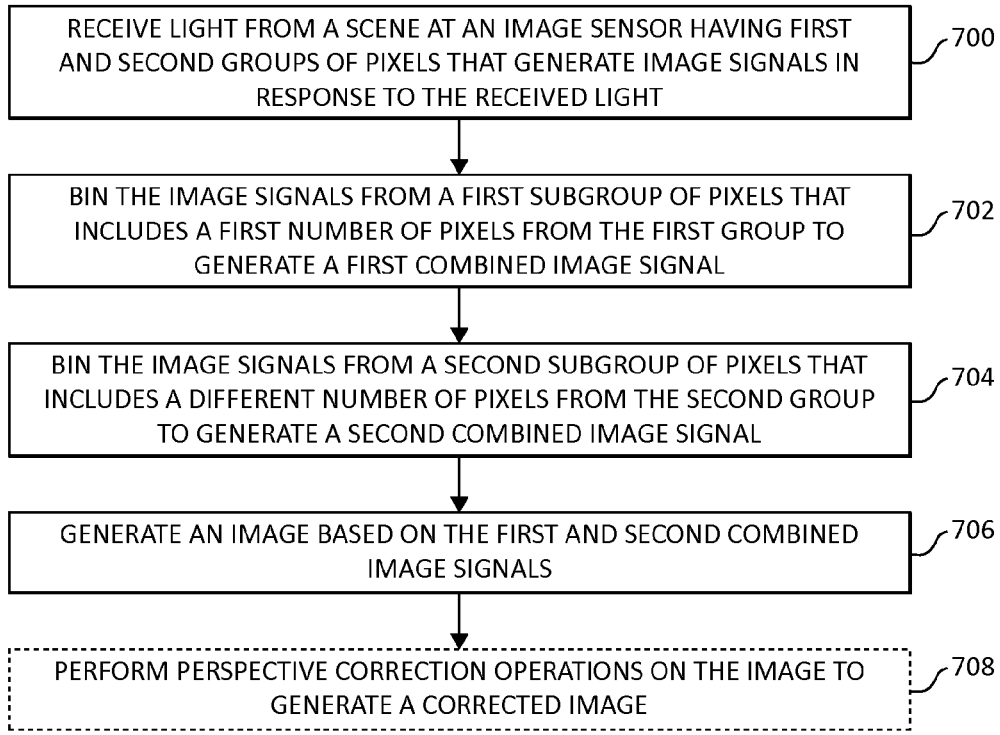
FIG. 7 is a flow chart of illustrative steps that may be performed in generating an image using a weighted binning pixel readout method in accordance with an embodiment of the present invention.

A flow chart of illustrative steps that may be performed in generating an image using a weighted binning method as described above in connection with FIGS. 4A-C and 5A-C is shown in FIG. 7.

At step 700, an image sensor that includes an image pixel array having first and second groups of image pixels may receive light from a scene. The image pixels in the first and second groups may generate electrical image pixel signals in response to the received light. The group that each image pixel in the array "belongs" to may be pre-determined, or the image pixels may be grouped based on the electrical image pixel signals that they generate (e.g., processing operations may be used to determine which image pixels and corresponding electrical signals are placed into each group). If desired, the first group of pixels may include image pixels that generate image pixel signals in response to light from portions of the scene for which image data is scarce (e.g., far-off portions of the scene). The second group of pixels may include image pixels that generate image pixel signals in response to light form portions of the scene for which image data is abundant (e.g., close-up portions of the scene). This, however, is merely illustrative. In general, the first and second groups of image pixels may include any desired combinations of pixels.

At step 702, the image signals from a first sub-group of image pixels in the first group of image pixels may be binned using analog or digital binning operations to generate a first binned image signal. The first sub-group of image pixels may include a first number of pixels.

At step 704, the image signals from a second sub-group of image pixels in the second group of image pixels may be binned using analog or digital binning operations to generate a second binned image signal. The second sub-group of image pixels may include a second number of pixels. If desired, the first subgroup of image pixels may contain fewer pixels than the second subgroup of image pixels such that relatively fewer image signals from image pixels that generate "scarce" image data are binned into the combined first combined signal, while relatively more image signals from image pixels that generate "abundant" image data are binned into the second combined signal. Performing binning operations in this manner may help to maintain the quality (resolution) of the "scarce" image data.

At step 706, the first and second binned image signals may be combined to generate an image.

At optional step 708, perspective correction operations may be performed on the image to generate a corrected image (of the type shown in FIGS. 4C and/or 5C, for example). If desired, step 708 may be omitted.

Figure 8:
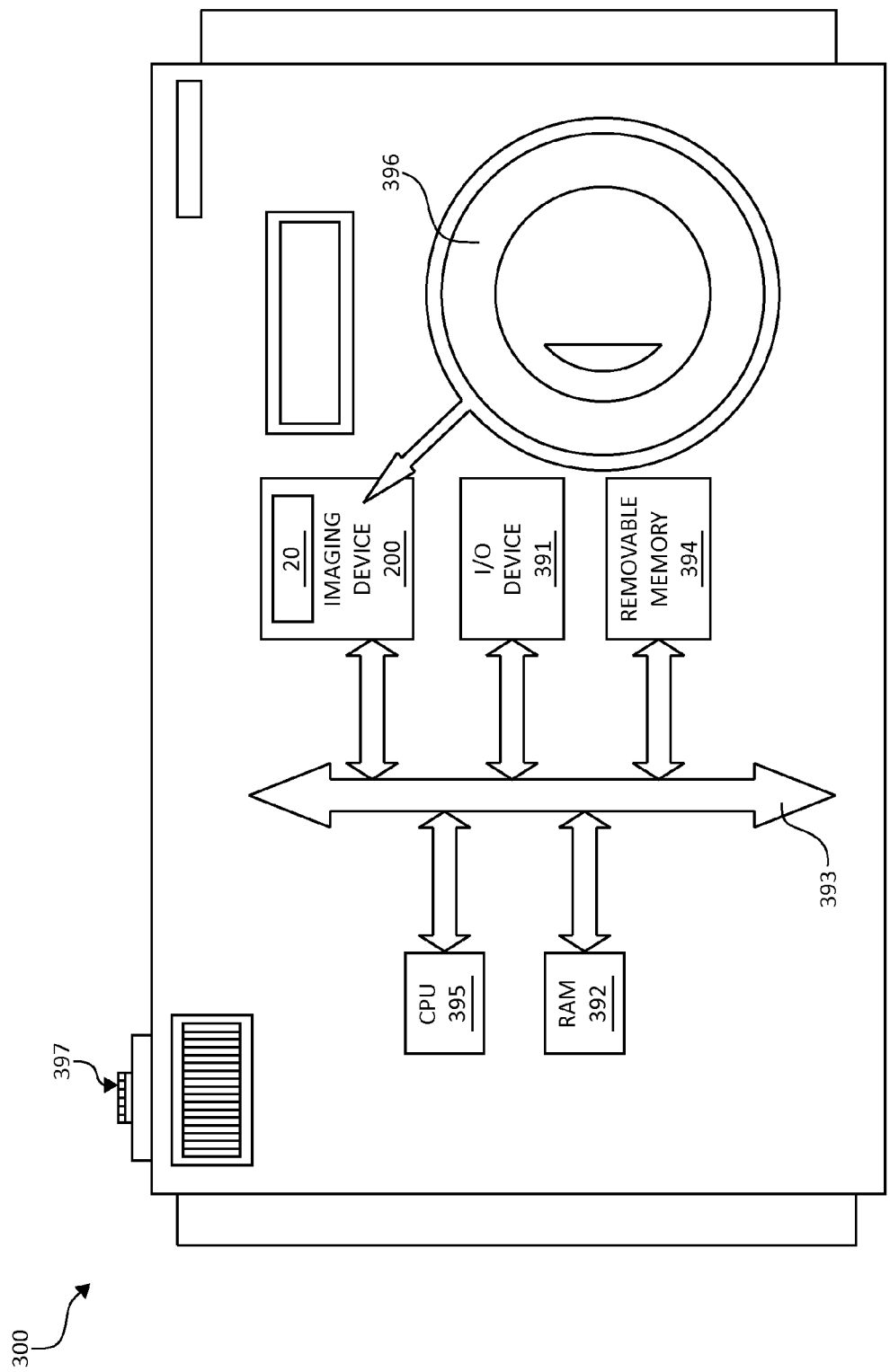
FIG. 8 is a block diagram of an illustrative processor system employing the embodiments of FIGS. 1-7 in accordance with an embodiment of the present invention.

FIG. 8 shows in simplified form a typical processor system 300, such as a digital camera, which includes an imaging device 200 (e.g., an imaging device 200 such as device 10 of FIGS. 1-7 having pixel arrays with weighted skipping and/or binning capabilities that may be used to generate perspective-corrected images using perspective correction operations). The processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

The processor system 300 generally includes a lens 396 for focusing an image on pixel array 20 of device 200 when a shutter release button 397 is pressed, central processing unit (CPU) 395, such as a microprocessor which controls camera and one or more image flow functions, which communicates with one or more input/output (I/O) devices 391 over a bus 393. Imaging device 200 also communicates with the CPU 395 over bus 393. The system 300 also includes random access memory (RAM) 392 and can include removable memory 394, such as flash memory, which also communicates with CPU 395 over the bus 393. Imaging device 200 may be combined with the CPU, with or without memory storage on a single integrated circuit or on a different chip. Although bus 393 is illustrated as a single bus, it may be one or more busses or bridges or other communication paths used to interconnect the system components.

Various embodiments have been described illustrating an electronic device (see, e.g., device 10 of FIG. 1) that includes an imaging system. An imaging system may include one or more image sensors. Each image sensor may include an array of image pixels formed on a semiconductor substrate. Each image pixel may include one or more photosensitive elements configured to convert incoming light into electric charges. The imaging system may include pixel control and readout circuitry for reading out the electric charges generated by the image pixels. Image signal processing circuitry that is part of the imaging system or otherwise included in device 10 may generate an image based on the image signals read out by the image pixels.

In accordance with various embodiment of the present invention, an imaging system may include an array of pixels divided into at least first and second groups. If desired, the array of pixels may be divided into three or more groups. The image pixels may generate image signals in response to incident light. The image signals may be read out from each of the groups using a different skipping pattern. In one suitable arrangement, a skipping pattern may refer to the ratio of the number of pixels in a group that are read out to the number of pixels in the group that are not read out (e.g., skipped). If desired, a skipping pattern may refer to the physical pattern of image pixels in the array from which image signals are read out. For example, a skipping pattern may refer to reading out image signals from image pixels in a checkerboard pattern without reading out the image signals from the other pixels, may refer to reading out image signals from image pixels in every other row and/or column of the pixel array without reading out image signals from the other pixels, may refer to reading out image signals only from image pixels in certain columns, rows, or other portions of the pixel array, etc. The skipping pattern that is applied to each group of pixels may be the same or different. For example, an image pixel array may be divided into three sections (groups) of pixels, and a different skipping pattern may be applied to the pixels in each section. If desired, two of the three skipping patterns may be the same. The applied skipping patterns may be determined based on the amount of image data that is available for portions of scene captured by the image sensor. A higher skipping ratio (e.g., skipping more pixels) may be applied to pixels in portions of the pixel array that generate pixels signals for portions of the scene for which image data is abundant, and a lower skipping ratio (e.g., skipping less pixels) may be applied to pixels in portions of the pixel array that generate pixel signals for portions of the scene for which image data is scarce. In other words, the percentage of image pixels that are skipped may be higher in some portions of the pixel array than others. Processing circuitry may generate an image based on the image signals that are read out from the pixels. Perspective correction operations may be applied to the image to correct for perspective distortion. Weighted skipping operations as described above may help to ensure that there is sufficient image data available to perform perspective correction operations on the entire image.

In accordance with various embodiments of the present invention, weighted image signal binning operations may be used in conjunction with or in place of weighted skipping operations. Weighted binning operations may include binning image signals from pixels based on the location of the pixels in the array. In portions of the array that generate image signals for portions of the scene for which large amounts of image data are available, a larger number of image signals may be binned. In portions of the array that generate image signals for portions of the scene for which small amounts of image data are available, a smaller number of image signals may be binned. The image signals may be binned before or after being read out by image pixel readout circuitry (e.g., the image signals may be binned using analog or digital binning). The image signals may be binned to generate combined (binned) image signals, which may be used to generate an image. Perspective correction operations may be applied to the image. Weighted binning operations as described above may help to ensure that there is sufficient image data available to perform perspective correction operations on the entire image.

In accordance with various embodiment of the present invention, a system may include a central processing unit, memory, input-output circuitry, and an imaging device. The imaging device may include a pixel array and associated pixel readout and image signal processing circuitry for reading out image signals using weighted binning and/or skipping operations to generate an image. The image may be generated using image signal processing circuitry in the imaging device or elsewhere in the system. The lens may be a wide-view lens that directs additional light from a scene onto the pixel array. Perspective correction operations may be performed using processing circuitry in the imaging system or using processing circuitry elsewhere in the system.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for operating an imaging system having a pixel array that includes a first group of image pixels and a second group of image pixels, the method comprising:
    with the first group of image pixels and the second group of image pixels, generating image signals in response to light from a scene that is received at the pixel array, wherein the second group of image pixels is formed in a center portion of the pixel array, wherein the first group of image pixels is formed in a peripheral portion of the pixel array that is located on at least one side of the center portion, and wherein the first group of image pixels receives light from a first portion of the scene and the second group of image pixels receives light from a second portion of the scene that is closer to the imaging system than the first portion;
    reading out the image signals from the first group of image pixels using a first skipping pattern; and
    reading out the image signals from the second group of image pixels using a second skipping pattern that is different than the first skipping pattern, wherein the first group of image pixels comprises first and second subgroups of image pixels, wherein using the first skipping pattern comprises reading out the image signals from the image pixels in the first subgroup without reading out the image signals from the image pixels in the second subgroup, and wherein the second subgroup includes a first percentage of the image pixels in the first group, wherein the second group of image pixels comprises third and fourth subgroups of image pixels, wherein using the second skipping pattern comprises reading out the image signals from the image pixels in the third subgroup without reading out the image signals from the image pixels in the fourth subgroup, and wherein the fourth subgroup includes a second percentage of the image pixels in the second group, wherein the first percentage is less than the second percentage.

2. The method defined in claim 1, further comprising:
    generating an image based on the image signals read out from the first subgroup of image pixels and the image signals read out from the third subgroup of image pixels.

3. A method for operating an imaging system having a pixel array that includes a first group of image pixels and a second group of image pixels, the method comprising:
    with the first group of image pixels and the second group of image pixels, generating image signals in response to light from a scene that is received at the pixel array, wherein the first group of image pixels receives light from a first portion of the scene and the second group of image pixels receives light from a second portion of the scene that is closer to the imaging system than the first portion;
    reading out the image signals from the first group of image pixels using a first skipping pattern;
    reading out the image signals from the second group of image pixels using a second skipping pattern that is different than the first skipping pattern, wherein the first group of image pixels comprises first and second subgroups of image pixels, wherein using the first skipping pattern comprises reading out the image signals from the image pixels in the first subgroup without reading out the image signals from the image pixels in the second subgroup, and wherein the second subgroup includes a first percentage of the image pixels in the first group, wherein the second group of image pixels comprises third and fourth subgroups of image pixels, wherein using the second skipping pattern comprises reading out the image signals from the image pixels in the third subgroup without reading out the image signals from the image pixels in the fourth subgroup, and wherein the fourth subgroup includes a second percentage of the image pixels in the second group, wherein the first percentage is less than the second percentage;
    generating an image based on the image signals read out from the first group of image pixels and the image signals read out from the second group of image pixels; and
    performing a perspective correction operation on the image to correct for perspective distortion that results from the second portion of the scene being closer to the imaging system than the first portion of the scene, wherein the perspective correction operation generates a corrected image based on the image signals read out from the first and second groups of image pixels.

4. An imaging system, comprising:
    a pixel array that includes a first group of image pixels and a second group of image pixels, wherein the first and second groups of image pixels are configured to generate image signals in response to light from a scene that is received at the pixel array, wherein the second group of image pixels is formed in a center portion of the pixel array, wherein the first group of image pixels is formed in a peripheral portion of the pixel array that is located on at least one side of the center portion, and wherein the first group of image pixels is configured to capture light from a first portion of the scene and the second group of image pixels is configured to capture light from a second portion of the scene that is closer to the imaging system than the first portion; and
    pixel readout circuitry that is configured to read out the image signals from the first group of image pixels using a first skipping pattern and is configured to read out the image signals from the second group of image pixels using a second skipping pattern that is different than the first skipping pattern, wherein the first group of image pixels comprises:
    a first subgroup of image pixels; and a second subgroup of image pixels, wherein the pixel readout circuitry is configured to read out the image signals from the first group of image pixels using the first skipping pattern by reading out the image signals from the image pixels in the first subgroup of image pixels without reading out the image signals from the image pixels in the second subgroup of image pixels and wherein the second subgroup includes a first percentage of the image pixels in the first group, wherein the second group of image pixels comprises:

a third subgroup of image pixels; and a fourth group of image pixels, wherein the pixel readout circuitry is configured to read out the image signals from the second group of image pixels using the second skipping pattern by reading out the image signals from the image pixels in the third subgroup of image pixels without reading out the image signals from the image pixels in the fourth subgroup of image pixels, wherein the fourth subgroup includes a second percentage of the image pixels in the second group, and wherein the first percentage is less than the second percentage.

5. The imaging system defined in claim 4, wherein the pixel readout circuitry is configured to generate an image based on the image signals read out from the first subgroup of image pixels and the image signals read out from the third subgroup of image pixels.

6. An imaging system, comprising:

a pixel array that includes a first group of image pixels and a second group of image pixels, wherein the first and second groups of image pixels are configured to generate image signals in response to light from a scene that is received at the pixel array, wherein the first group of image pixels is configured to capture light from a first portion of the scene and the second group of image pixels is configured to capture light from a second portion of the scene that is closer to the imaging system than the first portion; and pixel readout circuitry that is configured to read out the image signals from the first group of image pixels using a first skipping pattern and is configured to read out the image signals from the second group of image pixels using a second skipping pattern that is different than the first skipping pattern, wherein the first group of image pixels comprises:

a first subgroup of image pixels; and a second subgroup of image pixels, wherein the pixel readout circuitry is configured to read out the image signals from the first group of image pixels using the first skipping pattern by reading out the image signals from the image pixels in the first subgroup of image pixels without reading out the image signals from the image pixels in the second subgroup of image pixels and wherein the second subgroup includes a first percentage of the image pixels in the first group, wherein the second group of image pixels comprises:

a third subgroup of image pixels; and a fourth group of image pixels, wherein the pixel readout circuitry is configured to read out the image signals from the second group of image pixels using the second skipping pattern by reading out the image signals from the image pixels in the third subgroup of image pixels without reading out the image signals from the image pixels in the fourth subgroup of image pixels, wherein the fourth subgroup includes a second percentage of the image pixels in the second group, and wherein the first percentage is less than the second percentage, wherein the pixel readout circuitry is configured to generate an image based on the image signals read out from the first group of image pixels and the image signals read out from the second group of image pixels, and wherein the pixel readout circuitry is configured to generate a corrected image by performing a perspective correction operation on the generated image to correct for perspective distortion that results from the second portion of the scene being closer to the imaging system than the first portion of the scene.

7. The imaging system defined in claim 4, wherein the pixel array further comprises:

a third group of image pixels that is configured to capture light from a third portion of the scene, wherein the pixel readout circuitry is configured to read out the image signals from the third group of image pixels that using a third skipping pattern that is different from the first and second skipping patterns.

* * * * *